United States Patent [19]

Tokunaga et al.

[11] Patent Number: 4,619,300
[45] Date of Patent: Oct. 28, 1986

[54] PNEUMATIC TIRE TREAD

[75] Inventors: Seiichiro Tokunaga, Higashimurayama; Nobumasa Ikeda, Kodaira, both of Japan

[73] Assignee: Bridgestone Corporation, Japan

[21] Appl. No.: 676,332

[22] Filed: Nov. 29, 1984

[30] Foreign Application Priority Data

Nov. 30, 1983 [JP] Japan ................................. 58-224512
Mar. 29, 1984 [JP] Japan ................................. 59-59475

[51] Int. Cl.⁴ ............................................ B60C 11/03
[52] U.S. Cl. ................................................ 152/209 R
[58] Field of Search ................. 152/209 R, 209 D, 374

[56] References Cited

U.S. PATENT DOCUMENTS 4,444,236 4/1984 Kan et al. ...................... 152/209 R

FOREIGN PATENT DOCUMENTS 2362627 6/1975 Fed. Rep. of Germany ... 152/209 R
2422707 11/1975 Fed. Rep. of Germany ... 152/209 R Primary Examiner—Michael Ball
Attorney, Agent, or Firm—Sughrue, Mion, Zinn, Macpeak and Seas

[57] ABSTRACT

Disclosed herein is a pneumatic tire having a tread pattern formed in a tread portion divided into separate blocks at an outer surface of a tread rubber layer in at least a central region of said tread portion by a plurality of main grooves extending circumferentially and a great number of lateral grooves each extending toward a cross direction to each of said main grooves and having a shallower portion as compared with said main groove. The tread portion is a cap-base composite tread portion composed of an upper rubber layer forming a pattern of blocks and a lower rubber layer bordered on said upper rubber layer just therebeneath by a face connecting groove bottoms of said shallower portions of lateral grooves and forming a pattern of ribs separated from one another by said main grooves in the lateral direction and extending substantially continuously in the circumferential direction, and said upper rubber layer is substantially composed of a cap rubber having a JIS hardness at −20° C. of not more than 75° and said lower rubber layer is substantially composed of a base rubber having a JIS hardness at 100° C. of not less than 54° and a loss tangent of not more than 0.22 at 50 Hz, 25° C. and a strain of 2%.

39 Claims, 6 Drawing Figures

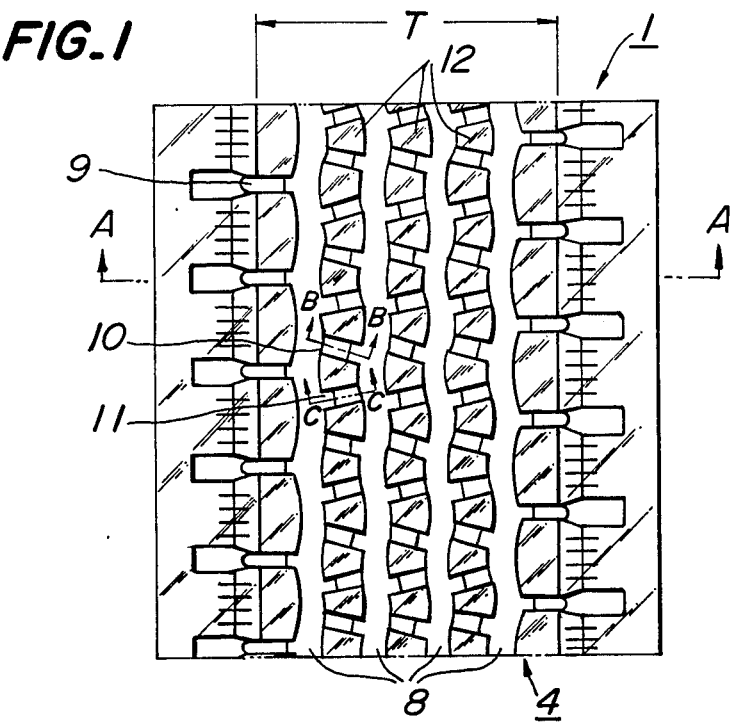
FIG._1
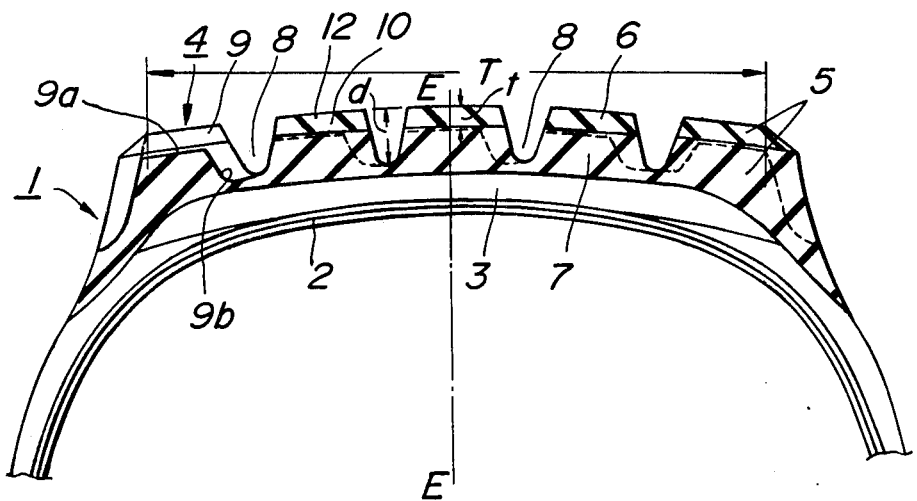
FIG._2a
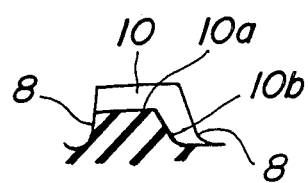
FIG._2b
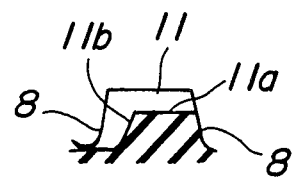
FIG._2c

PNEUMATIC TIRE TREAD

BACKGROUND OF THE INVENTION (1) Field of the Invention

The present invention relates to a pneumatic tire, and more particularly, the invention relates to an improvement on a so-called all season type pneumatic tire which is used throughout the year from the winter season to the summer season, and is to provide the tire of this type which is favorably applied to the heavy duty pneumatic radial tires particularly for use in trucks, buses and so on.

(2) Description of the Prior Art

It is well known that as to the tires which are frequently used throughout the year, the performance required for the tires in the winter season during which they are obliged to run on ice and snow roads differ from those in the case of the other seasons. That is, while the first priority is imposed upon the high performance on ice and snow during the winter, particularly a low rolling resistance (low fuel consumption), a high wear resistance and so forth are needed during seasons other than the winter.

Heretofore, with respect to the so-called all season type tires which are intended to be used throughout the year, on the assumption that they begin use in the winter, there have been proposed such tires in which the tread pattern is composed of a so-called block pattern consisting of independent blocks from the new tire stage to the tire wearing middle stage, and the pattern is changed to a so-called rib pattern having ribs extending in the circumferential direction subsequently to the middle wear stage, whereby the performance required in all seasons are met. In such tires, in order to obtain higher performance on ice and snow, it is common practice to use as a tread rubber a rubber of a peculiar composition which gives a relatively large frictional force particularly at a low temperature. However, the tires in which rubber of this kind is used as the tread rubber have the defects that since they generally have a large rolling resistance and a poor wear resistance, they are inversely disadvantageous during the seasons other than the winter and especially when in use on good roads.

SUMMARY OF THE INVENTION

It is an object of the present invention to eliminate the drawbacks of such conventional all season type tires, and to provide a pneumatic tire which can fully satisfy the performance required in both the winter season and the other seasons.

According to the present invention, there is a provision of a pneumatic tire having a tread pattern formed in a tread portion divided into separate blocks at an outer surface of a tread rubber layer in at least a central region of said tread portion by a plurality of main grooves extending circumferentially and a great number of lateral grooves each extending toward a cross direction to each of said main grooves and having a shallower portion as compared with said main groove. In accordance with this invention the tread portion is a cap-base composite tread portion composed of an upper rubber layer forming a pattern of blocks and a lower rubber layer bordered on said upper rubber layer just therebeneath by a face connecting groove bottoms of said shallower portions of lateral grooves and forming a pattern of ribs separated from one another by said main grooves in the lateral direction and extending substantially continuously in the circumferential direction, the upper rubber layer is substantially composed of a cap rubber having a JIS hardness at $-20°$ C. of not more than $75°$ and the lower rubber layer is substantially composed of a base rubber having a JIS hardness at $100°$ C. of not less than $54°$ and a loss tangent of not more than 0.22 at 50 Hz, $25°$ C. and a strain of 2%.

According to preferred embodiments of the invention, the width of the central region of the tread portion accounts for at least 50% of the width of the outer surface of the tread portion containing the equatorial line of the tire, the upper rubber layer has a gauge accounting for 10–75% of the predetermined depth of the main grooves, or the lateral grooves are provided with scooped portions reaching the groove bottoms of the main grooves.

By the above construction, the tire according to the present invention can be fitted to the conditions of the frozen or snow-heaped roads by the cap rubber composition which takes into a special consideration the block pattern at the use initial stage of the tire in the winter season, and can advantageously be fitted to a long distance running at a high speed on good roads by the base rubber composition which takes into consideration the rolling resistance and the wear resistance in the rib pattern exposed at the renewal of the tread portion surface by the wearing of the tread rubber until the tire is free from the bad weather conditions in due time.

These and other objects, features and advantages of the invention will be well appreciated upon reading of the following description of the invention when taken in connection with the attached drawings with understanding that some modifications, variations and changes could easily be accomplished by those skilled in the art to which the invention pertains without departing from the spirit of the invention nor the scope of the claims appended hereto.

BRIEF DESCRIPTION OF THE DRAWINGS

FIG. 1 is a developed view of a tread according to one embodiment of the invention;

FIGS. 2a, 2b and 2c are sectional views of the tread in FIG. 1 taken along line A—A, B—B and C—C, respectively;

DETAILED DESCRIPTION OF THE INVENTION

Figure 3:
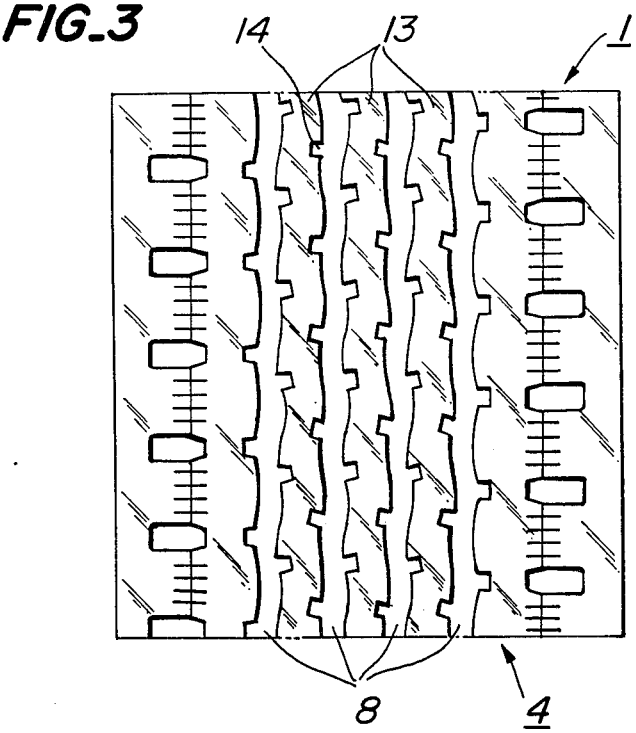
FIG. 3 is a developed view of the tread changed by the partial wearing.

The invention will be described more in detail with reference to the attached drawings in which specific embodiments thereof are illustrated.

In FIG. 1 is shown a developed plan view of a tread pattern before use, and principal portions of the respective sections are shown in FIGS. 2a, 2b, and 2c.

This example is a radial tire to which the invention is applied. As shown in FIG. 2a, the tire 1 possesses a carcass 2 composed of at least one rubberized ply layer having cords arranged substantially at $90°$ with respect to the equatorial plane E of the tire 1 and a belt 3 containing at least two rubberized ply layers having steel cords arranged at a relatively small angle with respect to the equatorial plane E and crossing with one another.

The tread portion 4 of the tire 1 has a tread rubber layer 5 outside of the belt 3 in the radial direction of the tire, the tread rubber layer 5 is composed of an upper rubber layer 6 on the outside in the radial direction and a lower rubber layer 7 on the inside in the radial direction.

The upper rubber layer 6 depicts a tread pattern as illustrated by way of example in FIG. 1 at the time of the new stage of the tire 1. This pattern is a block pattern in which independent blocks 12 are separated from one another by a plurality of, four in this embodiment, main grooves 8 extending in the circumferential direction and a number of lateral grooves 9, 10 and 11 intersecting therewith. As shown in FIGS. 2a, 2b and 2c, the lateral grooves 9, 10 and 11 have portions 9a, 10a and 11a shallower than the main grooves 8. After the tread rubber layer 5 is worn at a specific amount as the tire runs, the tread pattern is changed to the rib pattern as shown in FIG. 3 consisting of the ribs 13 which are separated from one another in the lateral direction by the main grooves 8 and extending substantially continuously in the circumferential direction. The remaining portions of the lateral grooves 9, 10 and 11, that is, scooped portions shown by b suffixed thereto in this embodiment remain as notches 14 of the ribs 13, when they have been formed at the common depth with the main grooves 8 as shown in the figures.

In the illustrated embodiments, the upper rubber layer 6 borders the lower rubber layer 7 by a boundary surface connecting the groove bottoms of the shallower portions 9a, 10a and 11a of the lateral grooves 9, 10 and 11. When the upper layer rubber 6 depicting the block pattern is worn out, the lower rubber layer 7 is exposed, whereby the rib pattern appears.

Although by such a change in the tread pattern, both the performances on the ice and snow during the winter season and the low fuel consumption and wear resistance during the seasons other than the winter can be attained to some degree on the assumption that the tire begins to be used during the winter, satisfactory results can not fully be obtained yet by this construction alone as mentioned above. According to the present invention, rubbers meeting the performance required for the respective seasons are adopted as the upper rubber layer 6 depicting the block pattern and the lower rubber layer 7 depicting the rib pattern as follows:

That is, while the upper rubber layer 6 is substantially composed of a cap rubber of a JIS hardness of not more than 75° at −20° C., the lower rubber layer 7 is substantially composed of a base rubber of a JIS hardness of not less than 54° at 100° C., and a loss tangent of not more than 0.22 at 50 Hz, 25° C. and a strain of 2%. The term "substantially" used here implies that the interface between the cap rubber and the base rubber (shown by solid lines in the tread rubber layer 5 in FIGS. 2a and 4) may not be completely in conformity with the interface at which the block pattern transfers into the rib pattern, that is, the interface between the upper rubber layer 6 and the lower rubber layer 7 and the former may be slightly deviate from the latter for the reason on the manufacturing or other intentional reasons, for example, the cap rubber may slightly enters the lower rubber layer 7 as shown by the solid lines in FIG. 4.

Figure 4:
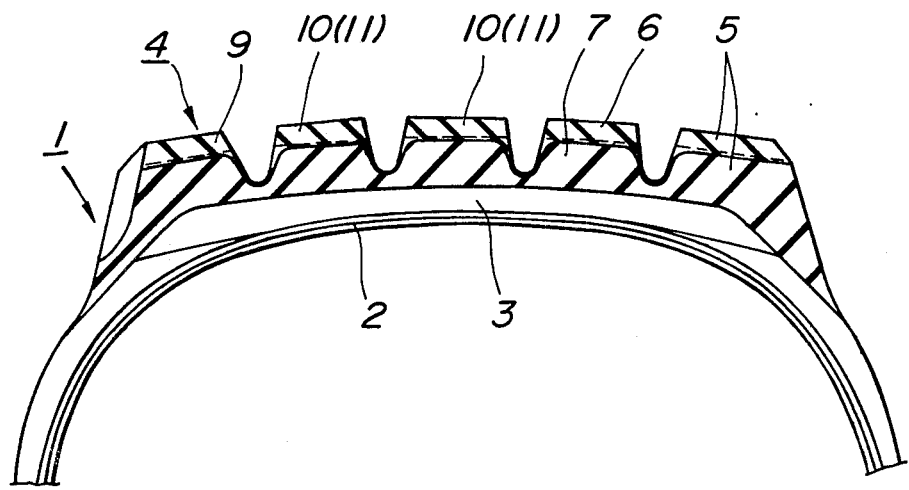
FIG. 4 is a sectional view of a tread according to another embodiment of the invention.

In FIG. 4, the upper rubber layer 6 and the lower rubber layer 7 are demarcated by broken lines denoting the groove bottoms of the shallower portions of the lateral grooves 9, 10 and 11, this embodiment is one in which no scooped portions are provided in the lateral grooves 9, 10 and 11.

If the JIS hardness at −20° C. of the cap rubber is larger than 75°, sufficient performance on the ice and snow, that is, sufficient braking performance on the ice and snow roads can not be obtained. The JIS hardness is preferably 60°–75°, and more preferably 65°–72°. The JIS hardness at 100° C. of the cap rubber is preferably 48°–56°, and more preferably 50°–54°, and the loss tangent (tan δ) at 50 Hz, 25° C. and the strain of 2% thereof is preferably 0.20–0.30, and more preferably 0.23–0.27, and the loss elastic modulus under the same conditions as given above preferably being 12–26 kg/cm$^2$, and more preferably 15–21 Kg/cm$^2$.

As the composition of the cap rubber which gives such performance, mention may be made of, for instance, the one composed of NR (or polyisoprene rubber)/polybutadiene rubber at a ratio of 50/50–100/0, and as a compounding agent, carbon black having an iodine-adsorbing value of 90–150 mg/g in an amount of 55–85 parts by weight with respect to 100 parts by weight of the rubber, a softener in an amount of 10–40 parts by weight with respect to 100 parts by weight and other conventional compounding ingredient.

On the other hand, in order for the base rubber to exhibit a high wear resistance after the cap rubber is worn out, the JIS hardness at 100° C. thereof must be not less than 54°, and if the loss tangent at 50 Hz, 25° C. and a strain of 2% is larger than 0.22, particularly the rolling resistance becomes extremely larger. The absolute value of the JIS hardness at 100° C. of the base rubber is preferably 54°–60°, and more preferably 55°–58°. The absolute value of the JIS hardness at −20° C. of the base rubber is preferably 65°–85° C., and more preferably 70°–80°. The loss tangent under the above conditions is preferably 0.15–0.22, and more preferably 0.17–0.20, and the loss elastic modulus under the conditions of 50 Hz, 25° C. and the strain of 2% is preferably 8–22 kg/cm$^2$ and more preferably 10–16 kg/cm$^2$. It is preferable that the JIS hardness at 100° C. of the base rubber is equivalent to or more than that of the cap rubber, and the loss tangent and the loss elastic modulus of the base rubber under the above conditions are preferably made smaller as compared with those of the cap rubber.

The following composition may be given as an example of the base rubber. That is, the composition is composed of NR/diene type polymer at a ratio of 90/10–100/0, carbon black with an iodine-adsorption value of 115–150 mg/g in an amount of 40–55 parts by weight with respect to 100 parts by weight of the rubber and other ordinary compounding ingredient.

The cap-base composite tread portion need not necessarily extend all over the tread portion 4, and the composite tread portion may be applied to the central region only, that is, the region having a certain width including the equatorial line of the tire. It is sufficient that the composite tread portion is applied to the region in a width accounting for at least 50% of the width T of the outer surface of the tread portion including the equatorial line.

The thickness t of the upper rubber layer 6, that is, the portion depicting the block pattern is preferably 10–75% of the preset depth d of the main grooves 8 in order that the performances on the ice and snow during the winter season and the lower rolling resistance and the wear resistance after the winter season may be well balanced, and the preferable value thereof is 20–65%.

It is desirable that the above-mentioned tread pattern has the negative ratio (the value obtained through dividing the area of the groove portions in the outer surface of the tread portion by the total area of the outer surface of the tread portion) being 0.3-0.5 in the case of the new tire as shown in FIG. 1, whereas the negative ratio is 0.1-0.3 at a time when the upper rubber layer 6 depicting the block pattern is completely worn out and the lower rubber layer 7 depicting the rib pattern (FIG. 3) is exposed; and that the main grooves are extended in zigzag fashion such that the amplitude of the main groove 8 in the thus exposed rib pattern is not more than 150%, and more preferably not more than 40% of the width of the main groove.

In accordance with the present invention, there was prepared a test tire A having the construction as shown in FIGS. 1 and 2 in which the thickness t of the upper rubber layer 6, that is, the portions depicting the block pattern is 6.0 mm which is 36.4% of the depth d=16.5 mm of the main grooves 8 in a radial tire for use in trucks and buses having a tire size of 10.00 R 20. When the block pattern is worn out, this tire depicts the rib pattern in FIG. 3. The negative ratio of this block patterns is 0.40, while that of the rib pattern is 0.23. The amplitude of the main grooves 8 in the rib pattern is 3.0 mm which is 23.6% of the width (12.7 mm) of the main groove. The upper rubber layer 6 and the lower rubber layer 7 of the test tire A were composed respectively of a cap rubber and a base rubber having the compositions and the physical properties as shown in the following Table 1.

TABLE 1

| | | | | Cap rubber | Base rubber |
|---|---|---|---|---|---|
| Composition | NR/polybutadiene rubber | | | 65/35 | 100/0 |
| | Compounding agent | Carbon black | iodine-adsorbing value | 125 mg/g | 140 mg/g |
| | | | weight part per 100 weight part of rubber | 65 | 47 |
| | | Softener | weight part per 100 weight part of rubber | 26 | 2 |
| | | | Other ingredient | Stearic acid, Chinese white antioxidant, and other | Stearic acid, Chinese white antioxidant, and other |
| Physical properties | JIS hardness | | −20° C. | 71° | 78° |
| | | | 100° C. | 53° | 56° |
| | Loss tangent (50 Hz, 25° C., strain 2%) | | | 0.25 | 0.19 |
| | Loss elastic modulus (50 Hz, 25° C., strain 2%) | | | 19 kg/cm² | 15 kg/cm² |

On the other hand, a comparison tire B was constructed in completely the same as in the test tire A except that the upper rubber layer 6 and the lower rubber layer 7 were both composed of just the same rubber as the above-mentioned cap rubber and were not varied in rubber quality.

These tires were respectively actually mounted on a car and subjected to a braking test [a braking distance (m) required for stopping the car running at a speed of 30 km/h being measured] on a frozen road. Then, the upper rubber layer was completely worn out by running the car on a good road to expose the rib pattern. The test tires of this state were subjected to the actually mounting test on a good road, and the fuel consumption (km/l) and the wear resistance (km/mm) were measured after running the car at a speed of 40 km/h for a distance of 10,000 km and at a speed of 80 km/h for a distance of 10,000 km.

Test results thereof are shown in Table 2. Figures shown by index indication are by taking those of the test tire B as 100. The larger the figure, the better the performances. That is, the braking performance is expressed by the reciprocal ratio of the measured values.

TABLE 2

| | Braking performance | Fuel consumption | Wear resistance |
|---|---|---|---|
| Test Tire A | 99 | 103 | 143 |
| Comparison Tire B | 100 | 100 | 100 |

As mentioned above, according to the present invention, the high performance on the ice and snow during the winter season and the low rolling resistance (low fuel consumption) and the high wear resistance during the seasons other than the winter can all be attained in the all season type pneumatic tires which assumes that they begins to be used from the winter season.

What is claimed is:

1. An all season type pneumatic tire which is to be used throughout a year from a winter season through a summer season and comprises:

a tread pattern formed in a tread portion divided into separated blocks at an outer surface of a tread rubber layer in at least a central region of said tread portion by a plurality of main grooves extending circumferentially and a large number of lateral grooves each extending toward a cross direction to each of said main grooves and having a shallower portion as compared with said main groove, said tread portion being a cap-base composite tread portion composed of an upper rubber layer forming a pattern of blocks and a lower rubber layer bordered on said upper rubber layer just thereneath by a face connecting groove bottoms of said shallower portions of lateral grooves and forming a pattern of ribs separated from one another by said main grooves in the lateral direction and extending substantially continuously in the circumferential direction, and said upper rubber layer being substantially composed of a cap rubber having a JIS hardness at −20° C. of not more than 75° and said lower rubber layer being substantially composed of a base rubber having a JIS hardness at 100° C. of not less than 54° and a loss tangent of not more than 0.22 at 50 Hz, 25° C. and a strain of 2%.

2. A pneumatic tire according to claim 1, wherein the width of the central region accounts for at least 50% of the width of the outer surface of the tread portion including the equatorial line of the tire.

3. A pneumatic tire according to claim 1, wherein the gauge of the upper rubber layer is 10–75% of the preset depth of the main grooves.

4. A pneumatic tire according to claim 2, wherein the gauge of the upper rubber layer is 10–75% of the preset depth of the main grooves.

5. A pneumatic tire according to claim 1, wherein the lateral grooves are provided with scooped portions reaching the groove bottoms of the main grooves.

6. A pneumatic tire according to claim 1, wherein the loss elastic modulus of the cap rubber at 50 Hz, 25° C. and the strain of 2% is 12–26 kg/cm², and that of the base rubber is 8–22 kg/cm.

7. A pneumatic tire according to claim 6, wherein the loss elastic modulus of the cap rubber at 50 Hz, 25° C. and the strain of 2% is 15–21 kg/cm², and that of the base rubber is 10–16 kg/cm.

8. A pneumatic tire according to claim 3, wherein the gauge of the upper rubber layer is 20–65% of the preset depth of the main groove.

9. A pneumatic tire according to claim 1, wherein the negative ratio of the block pattern is 0.3–0.5 and that of the rib pattern is 0.1–0.3.

10. A pneumatic tire according to claim 1, wherein the tread pattern is divided into separate blocks at the outer surface of the tread rubber layer over the whole region of the tread portion.

11. A pneumatic tire according to claim 1, wherein the JIS hardness of the cap rubber at −20° C. is from 60° to 75°.

12. A pneumatic tire according to claim 11, wherein the JIS hardness of the cap rubber at −20° C. is from 65° to 72°.

13. A pneumatic tire according to claim 1, wherein the JIS hardness of the base rubber at −20° C. is from 65° to 85°.

14. A pneumatic tire according to claim 13, wherein the JIS hardness of the base rubber at −20° C. is from 70° to 80°.

15. A pneumatic tire according to claim 1, wherein the JIS hardness of the cap rubber at 100° C. is from 48° to 56°.

16. A pneumatic tire according to claim 15, wherein the JIS hardness of the cap rubber at 100° C. is from 50° to 54°.

17. A pneumatic tire according to claim 1, wherein the JIS hardness of the base rubber at 100° C. is from 54° to 60°.

18. A pneumatic tire according to claim 17, wherein the JIS hardness of the base rubber at 100° C. is from 55° to 58°.

19. A pneumatic tire according to claim 1, wherein the JIS hardness of the base rubber at 100° C. is equal to or more than that of the cap rubber.

20. A pneumatic tire according to claim 15, wherein the JIS hardness of the base rubber at 100° C. is equal to or more than that of the cap rubber.

21. A pneumatic tire according to claim 16, wherein the JIS hardness of the base rubber at 100° C. is equal to or more than that of the cap rubber.

22. A pneumatic tire according to claim 17, wherein the JIS hardness of the base rubber at 100° C. is equal to or more than that of the cap rubber.

23. A pneumatic tire according claim 18, wherein the JIS hardness of the base rubber at 100° C. is equal to or more than that of the cap rubber.

24. A pneumatic tire according to claim 1, wherein the loss of tangent of the cap rubber at 50 Hz, 25° C. and the strain of 2% is from 0.20 to 0.30.

25. A pneumatic tire according to claim 24, wherein the loss of tangent of the cap rubber at 50 Hz, 25° C. and the strain of 2% is from 0.23 to 0.27.

26. A pneumatic tire according to claim 1, wherein the loss of tangent of the base rubber at 50 Hz, 25° C. and the strain of 2% is from 0.15 to 0.22.

27. A pneumatic tire according to claim 26, wherein the loss of tangent of the base rubber at 50 Hz, 25° C. and the strain of 2% is from 0.17 to 0.20.

28. A pneumatic tire according to claim 1, wherein the loss of tangent of the base rubber at 50 Hz, 25° C. and the strain of 2% is smaller than that of the cap rubber.

29. A pneumatic tire according to claim 24, wherein the loss of tangent of the base rubber at 50 Hz, 25° C. and the strain of 2% is smaller than that of the cap rubber.

30. A pneumatic tire according to claim 25, wherein the loss of tangent of the base rubber at 50 Hz, 25° C. and the strain of 2% is smaller than that of the cap rubber.

31. A pneumatic tire according to claim 26, wherein the loss of tangent of the base rubber at 50 Hz, 25° C. and the strain of 2% is smaller than that of the cap rubber.

32. A pneumatic tire according to claim 27, wherein the loss of tangent of the base rubber at 50 Hz, 25° C. and the strain of 2% is smaller than that of the cap rubber.

33. A pneumatic tire according to claim 1, wherein the loss elastic modulus of the base rubber at 50 Hz, 25° C. and the strain of 2% is smaller than that of the cap rubber.

34. A pneumatic tire according to claim 2, wherein the loss elastic modulus of the base rubber at 50 Hz, 25° C. and the strain of 2% is smaller than that of the cap rubber.

35. A pneumatic tire according to claim 28, wherein the loss elastic modulus of the base rubber at 50 Hz, 25° C. and the strain of 2% is smaller than that of the cap rubber.

36. A pneumatic tire according to claim 29, wherein the loss elastic modulus of the base rubber at 50 Hz, 25° C. and the strain of 2% is smaller than that of the cap rubber.

37. A pneumatic tire according to claim 30, wherein the loss elastic modulus of the base rubber at 50 Hz, 25° C. and the strain of 2% is smaller than that of the cap rubber.

38. A pneumatic tire according to claim 31, wherein the loss elastic modulus of the base rubber at 50 Hz, 25° C. and the strain of 2% is smaller than that of the cap rubber.

39. A pneumatic tire according to claim 32, wherein the loss elastic modulus of the base rubber at 50 Hz, 25° C. and the strain of 2% is smaller than that of the cap rubber.

* * * * *